United States Patent [19]

Urban

[11] Patent Number: 5,852,735
[45] Date of Patent: Dec. 22, 1998

[54] METHOD AND APPARATUS FOR EXCHANGING A PROGRAM OVER A NETWORK COMPUTER SYSTEM THAT PERMITS REACTIVATION OF THE ORIGINAL PROGRAM IF AN ERROR OCCURS

[75] Inventor: Hans-Jürgen Urban, Weissach, Germany

[73] Assignee: Alcatel SEL Aktiengesellschaft, Stuttgart, Germany

[21] Appl. No.: 518,621

[22] Filed: Aug. 23, 1995

[30] Foreign Application Priority Data

Aug. 24, 1994 [DE] Germany .......................... 44 29 969.9

[51] Int. Cl.$^6$ .................................................. G06F 15/00
[52] U.S. Cl. ...................................... 395/712; 395/200.1
[58] Field of Search ..................... 395/182.13, 200.11, 395/200.1, 650, 700, 182.02, 500, 712, 678, 569, 182.15

[56] References Cited

U.S. PATENT DOCUMENTS

| | | | |
|---|---|---|---|
| 4,954,941 | 9/1990 | Redman .................................. | 395/712 |
| 4,958,278 | 9/1990 | Meguro ............................... | 395/200.09 |
| 5,008,814 | 4/1991 | Mathur . | |
| 5,142,680 | 8/1992 | Ottman et al. .......................... | 395/700 |
| 5,155,837 | 10/1992 | Liu et al. ................................ | 395/500 |
| 5,274,808 | 12/1993 | Miyao et al. ........................... | 395/712 |
| 5,339,430 | 8/1994 | Lundin et al. .......................... | 395/685 |
| 5,359,730 | 10/1994 | Marron ................................... | 395/712 |
| 5,386,552 | 1/1995 | Garney ............................... | 395/182.08 |
| 5,410,703 | 4/1995 | Nilsson et al. .......................... | 395/700 |
| 5,421,009 | 5/1995 | Platt ........................................ | 395/600 |
| 5,437,047 | 7/1995 | Nakamura .......................... | 395/200.03 |
| 5,515,538 | 5/1996 | Kleiman .................................. | 395/733 |
| 5,530,801 | 6/1996 | Kobayashi ......................... | 395/182.11 |
| 5,530,802 | 6/1996 | Fuchs et al. ....................... | 395/182.15 |
| 5,555,416 | 9/1996 | Owens et al. ........................... | 395/712 |

FOREIGN PATENT DOCUMENTS

| | | |
|---|---|---|
| 0557682 | 9/1993 | European Pat. Off. . |
| 3619660 | 8/1991 | Germany . |
| 4103411 | 8/1991 | Germany . |
| 4205372 | 11/1992 | Germany . |
| 4134207 | 4/1993 | Germany . |
| 9401819 | 1/1994 | WIPO . |

OTHER PUBLICATIONS

"On–Line Software Extension and Modification", U. Apel, *Electrical Communication*, vol. 64, No. 4, 1990, pp. 327–333.

"Technological Enhancement", R. Cohen, *Electrical Communication*, vol. 59, No. 1/2, 1985, pp. 29–34.

"Architecture for Change", R. Mauger, *Electrical Communication*, vol. 59, No. 1/2, 1985, pp. 35–42.

*Primary Examiner*—Tod R. Swann
*Assistant Examiner*—Christopher S. Chow
*Attorney, Agent, or Firm*—Ware, Fressola, Van Der Sluys & Adolphson LLP

[57] ABSTRACT

A method for a program-package change in a multicomputer system (MRS) and a computer (PR1) for the multicomputer system (MRS) are disclosed. During the program-package change, the interruption of the processes being controlled by the multicomputer system (MRS) is to be kept as short as possible. In addition, for reasons of security, fallback on operation of the multicomputer system (MRS) with the replaced, old program package is to be possible. According to the invention, each computer (PR1, . . . , PRN, SR) of the multicomputer system (MRS) has in its main memory (RAM1) an area (PPN) in which the new program package is stored before the actual replacement procedure begins. During the program-package change, each of the computers (PR1, . . . , PRN, SR) is loaded with the new program package from its main memory (RAM1).

15 Claims, 3 Drawing Sheets

METHOD AND APPARATUS FOR EXCHANGING A PROGRAM OVER A NETWORK COMPUTER SYSTEM THAT PERMITS REACTIVATION OF THE ORIGINAL PROGRAM IF AN ERROR OCCURS

TECHNICAL FIELD

The present invention relates to a method and apparatus for exchanging an old program-package for a new program-package in a multicomputer system.

BACKGROUND OF THE INVENTION

Such a multicomputer system is known from an article by R. Cohen, "System 12, Technological Enhancement", *Electrical Communication*, Vol. 59, No. 1/2, 1985, pages 29–34. In the multicomputer system described therein, each of several peripheral computers represents a terminal control element for a terminal module and is connected to a digital switching network which performs the function of a computer communication network. An auxiliary control element, which is also connected to the digital switching network, corresponds to a system computer.

To replace a program package, a new program package is copied from the system computer to the peripheral computers via the computer communication network. To this end, the peripheral computers and the system computer each have a memory in addition to a control facility. The peripheral computers are arranged in pairs, so that program packages can be replaced without a system interrupt.

In an article R. H. Mauger, "System 12, Architecture for Change", pages 35–42 of the same issue of *Electrical Communication*, the program-package change involving paired peripheral computers is dealt with in greater detail. First it is ensured that one of the paired peripheral computers takes over the functions of both peripheral computers. Then, the new program package is loaded into the other of the paired peripheral computers, and the latter takes over the functions of both peripheral computers. Next, the new program package is loaded into one of the paired peripheral computers, and after successful completion of the program-package change, each of the two peripheral computers can perform its original function again.

A similar method is described in Patent Specification DE 41 34 207 for a dual computer system. The new program package is loaded from an external input device into a passive computer via an active computer, and the passive computer is then started. If the new program package runs error-free in the passive computer, the latter will be switched to an active state and a previously active computer will be switched to a passive state. Then, the new program package is loaded from the now active computer into the now passive computer. If errors occur during operation, it is possible to fall back on the old program package or repeat the loading with the new program package.

The above printed publications deal only with the program-package change involving paired computers, one of which must initially be in the passive state. To this end, it must be isolated from the respective overall system with respect to its programs. If the (peripheral) computers are not configured in pairs, the program-package change involves waiting times, which can mean long outages of the overall system depending on the number of (peripheral) computers and the type of computer communication network used.

DISCLOSURE OF INVENTION

It is an object of the invention to keep an outage during a program-package change in a multicomputer system short.

According to a first aspect of the invention, a method of exchanging an old program-package for a new program-package in a multicomputer system, comprising a plurality of peripheral computers and at least one system computer, with the peripheral computers and the at least one system computer connected to a computer communication network, each peripheral computer having a main memory, is characterized by the following steps for execution in each of the peripheral computers and in the at least one system computer: (a) copying the new program-package to respective first areas of the main memories of the peripheral computers and the at least one system computer; (b) saving dynamic data of processes under the control of the multicomputer system in respective second areas of the main memories upon reaching a selected point in the execution of the old program-package; and (c) initializing a new program-package in the respective peripheral computers and the at least one system computer with the saved dynamic data.

According to an advantageous aspect of the invention, it is possible to fall back to a suitable fallback position on the replaced old program package in every phase of the program-package change.

According to another advantageous aspect of the invention, the new program package is copied into the main memories of the computers of the multicomputer system in compressed form, so that less expensive main memories of less capacity can be used.

According to a further advantageous aspect of the invention, on the occurrence of an error during the program-package change or during a predeterminable trial period, it is possible to either fall back on the old program package or, depending on the type of error that has occurred, make another attempt at a program-package change with the new program package in one or more of the peripheral computers or in the system computer of the multicomputer system.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
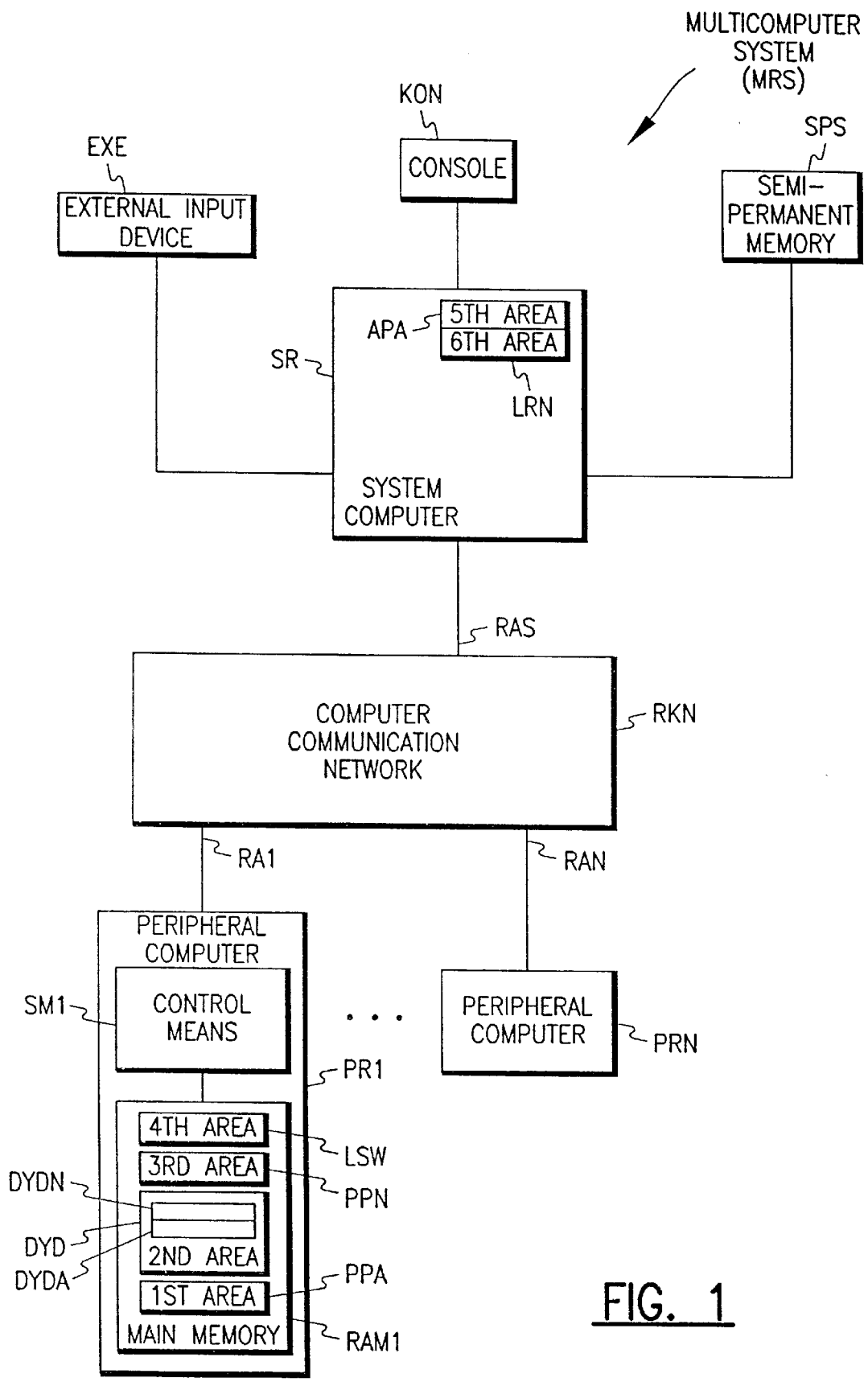
FIG. 1 shows a multicomputer system with one embodiment of a computer according to the invention.

FIG. 1 shows a multicomputer system MRS comprising a computer communication network RKN to which n peripheral computers PR1, . . . , PRN and a system computer SR are connected via associated links RA1, . . . , RAN and RAS, respectively. The computer communication network RKN can be a local area network (LAN), an ATM (asynchronous transfer mode) high-speed data network, a digital switching network, or any other computer communication network that can transport data between the connected peripheral and system computers.

In the embodiment shown, the peripheral computers PR1, . . . , PRN are identical in construction. Only the construction of the peripheral computer PR1 with its components relating to the invention will be described here but the other peripheral computers may be similar. The peripheral computer PR1 contains a main memory RAM1 and a control means SM1. The main memory RAM1 is a commercially available main memory of sufficient capacity, e.g., 64 Mbytes, and has a first area PPA, a second area DYD, which is divided into subareas DYDA and DYDN, a third area PPN, and a fourth area LSW. The first area PPA holds an old program package with which the processes being controlled by the first peripheral computer PR1 are controlled via the control means SM1. The old program package has a code segment with instructions to be executed by the control means SM1, such as an operating system and application programs, and a data segment which contains data that is accessed by the instructions in the code segment. The area PPA also holds a file management program which permits file-oriented access, i.e., logic addressing of a segment with, e.g., names, to instructions for a program-package change. In the embodiment, file management is performed according to the POSIX.1 standard 1003.1-1990 as defined in IEEE: IEEE Trial-Use Standard Portable Operating System for Computer Environments; IEEE Std. 1003.1, IEEE Computer Society New York, 1986. The file management program also contains copying functions between different data carriers. The old program package is to be exchanged for a new program package. For this new program package, the third area PPN is provided in the main memory RAM1.

In the subarea DYDA of the second area DYD of the main memory RAM1, dynamic data of the processes being controlled by the multicomputer system MRS or the peripheral computer PR1 is saved by the application programs during the processes upon reaching a favorable fallback position. To this end, checking marks are provided in the program packages at predetermined points, so that after a short interruption, the process states can be restored with the saved dynamic data and the processes can be continued. Frequently the reason for saving the dynamic data is to be able to control a restart of individual peripheral computers on the occurrence of instabilities during normal operation of the multicomputer system MRS with the old program package. The checking marks can therefore be used here for the program-package change. The dynamic data are specific to the processes. They are only needed during the lifetimes of the processes. One example of the dynamic data is the start time of the process or, if the process is, for example, the establishment of a connection from the peripheral computer PR1 to another peripheral computer PR2, . . . , PRN, the dialled call number and/or the identity of the resources seized for this connection.

The fourth area LSW holds a so-called bootstrap program which can cause the old program package, which is stored in a semipermanent memory SPS, to be reloaded at any time during the program-package change. The bootstrap in the fourth area LSW is in a protected portion of the main memory RAM1 and cannot be overwritten during a program-package change.

The construction of the peripheral computer PR1 just described is largely identical to that of the system computer SR. The system computer SR is also connected to an external input device EXE, to the semipermanent memory SPS, and to a console KON via which an operator can enter data into the multicomputer system MRS. The semipermanent memory SPS is, for example, a commercially available EEPROM, a hard disk, or any other memory of sufficient capacity whose contents are overwritable and which retains its contents when the power is turned off. The main memory of the system computer SR has, in addition to the four areas described in connection with the peripheral computer PR1, a fifth area APA and a sixth area LRN. The fifth area APA holds a program "job processing for program-package change", with the aid of which the system computer SR monitors the program-package change and exchanges messages via the computer communication network RKN with the other components of the multicomputer system MRS that are involved in the program-package change. The sixth area LRN holds a loader with which load requests from the computer communication network RKN, i.e., from the peripheral computers PR1, . . . , PRN connected thereto, are accepted and processed. The system computer SR can thus retrieve the required information from the semipermanent memory SPS or the external input device EXE, and initiate transfers to one or more of the peripheral computers PR1, . . . , PRN.

During the program-package change, this loader can ensure in particular that the old program package stored in the semipermanent memory SPS is reloaded on the occurrence of an error.

Figure 2:
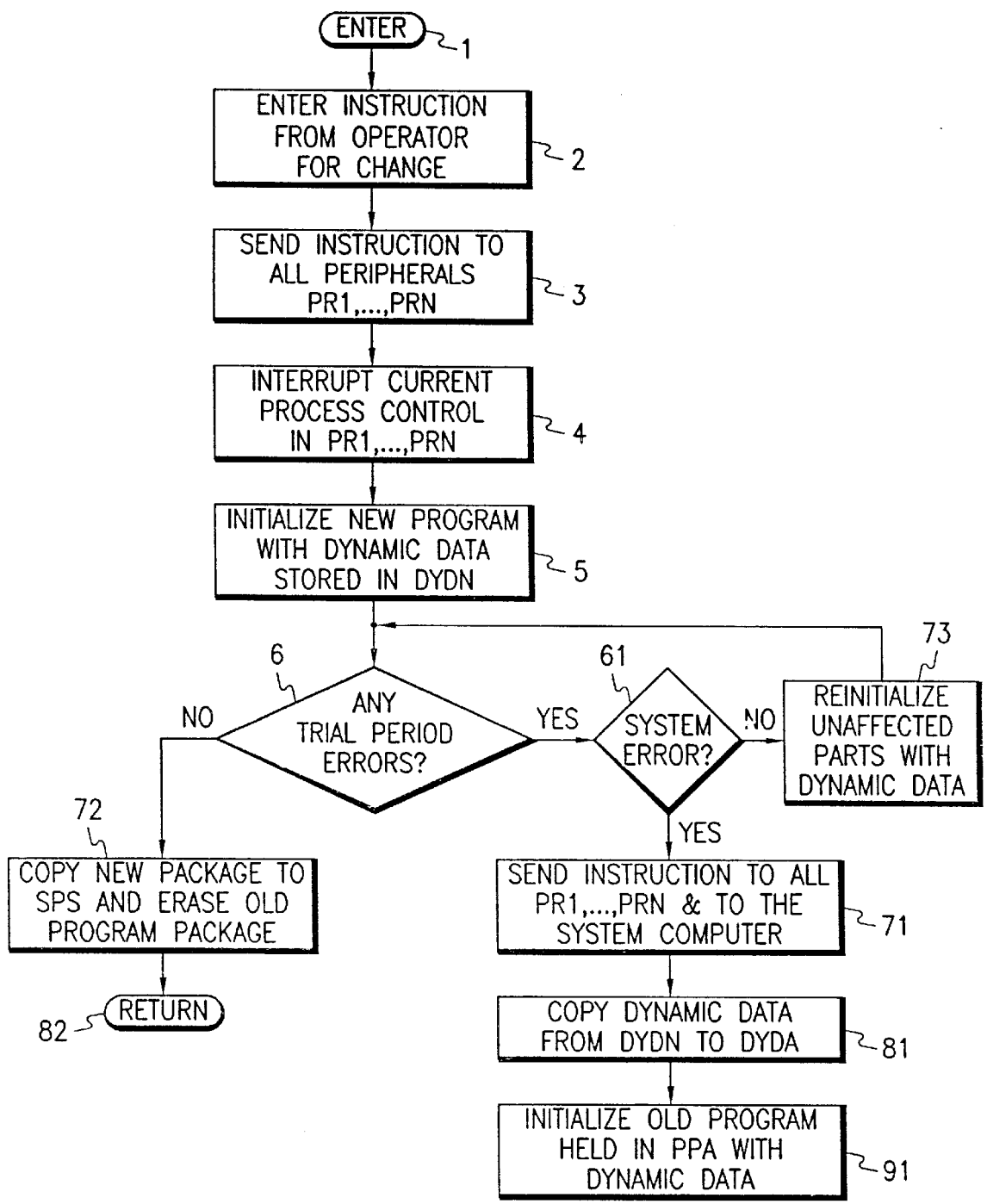
FIG. 2 is a flowchart of a first embodiment of the method according to the invention.

FIG. 2 shows the flowchart of the first embodiment of the method according to the invention. In a step 1, the starting position for the program-package change, the multicomputer system MRS is being operated with the old program package. The old program package is contained in the respective first areas PPA of the main memories of the peripheral computers PR1, PRN and the system computer SR and in the semipermanent memory SPS. The new program package is stored on a data carrier in the external input device EXE. After entry of the instruction for a program-package change by the operator at the console KON of the system computer SR, in a step 2, the new program package is, during a preparation time, copied from the data carrier in the external input device EXE to the main memory of the system computer SR and, via the computer communication network, to the main memories of the peripheral computers PR1, . . . , PRN. The new program package is stored into the third areas PPN of the main memories. The copying operation is performed with the aid of the file management program stored in the first areas PPA of the peripheral computers PR1, . . . , PRN and the system computer SR.

During the copying operation, the processes being controlled by the multicomputer system MRS continue under control of the old program package. In a next step 3, the request for a program-package change is distributed simultaneously to all peripheral computers PR1, . . . , PRN and to the system computer SR. In a step 4, the control of the current processes is interrupted in each of the peripheral computers PR1, . . . , PRN and in the system computer SR, and the dynamic data saved —as described above—in the subarea DYDA of the second area DYD is copied to the subarea DYDN of the second area DYD, so that all processes being controlled by the multicomputer system MRS can be restarted with the saved dynamic data.

In a step 5, the new program package in the third areas PPN of the main memories is initialized with the dynamic data saved in the subareas DYDN of the second areas DYD. Values are assigned to the variables of the new program system. Any changes in the structure of the saved dynamic data have to be taken into account for the initialization with the new program package. If that is the case, the dynamic data have to be reformatted while being copied from the subareas DYDA to the subareas DYDN of the second areas DYD. Thereafter, an indication that the initialization has been carried out is provided from the peripheral computers PR1, . . . , PRN to the system computer SR. During these steps, the old program system remains stored in the semipermanent memory SPS and in the first areas PPA. The multicomputer system MRS now runs with the new program package and controls the interrupted processes. In a step 6, a trial period is set and a check is made to determine whether during the process steps or in the trial period, any instabilities or error messages are occurring during operation of the multicomputer system MRS with the new program package. If that is the case, a check is made in a step 61 to determine whether the error message relates to the entire multicomputer system MRS. If so, in a step 71, the request for a program-package change is distributed to all peripheral computers PR1, . . . , PRN and to the system computer SR, as in step 3. In a step 81, the dynamic data of the processes being controlled by the multicomputer system is copied from the subareas DYDN to the subareas DYDA of the second areas DYD of the main memories, and in a step 91, the old program package held in the first areas PPA of the main memories is initialized with the dynamic data. In the example it is assumed that the structure of the dynamic data in the subareas DYDA and DYDN must be equal. Otherwise, suitable reformatting would be necessary. Another attempt to carry out the program-package change by the method according to the invention can be made.

If the error message relates not to the entire multicomputer system, but only to individual peripheral computers PR1, . . . , PRN or to the system computer SR, the method according to the invention can be modified so that after step 61, instead of carrying out steps 71 to 91, the new program package in the third areas PPN of the main memories of these peripheral computers PR1, . . . , PRN or the system computer SR is reinitialized with the dynamic data in a step 73. After step 73, step 6 is performed again. If there are no error messages or instabilities, the new program package will, after the trial period, be copied to the semipermanent memory SPS in a step 72, with the old program package in the semipermanent memory SPS being erased. In a step 82, the method according to the invention is complete and the multicomputer system MRS is operated stably with the new program package.

According to a further advantageous feature of the invention, it is possible to copy the new program package in compressed form from the data carrier in the external input device EXE to the third areas PPN of the main memories of the peripheral computers PR1, . . . , PRN and the system computer SR. "Compression" as used herein means, for example, that bits are combined block by block if they have the same value. Thus, if memory address 100 to memory address 200 are occupied exclusively by the bit "1", compression will be performed as follows: from memory address 100 to memory address 200 25 times F (hexadecimal, equivalent to binary 1111). In this manner, memory capacity can be saved. Other compression schemes are also applicable.

Figure 3:
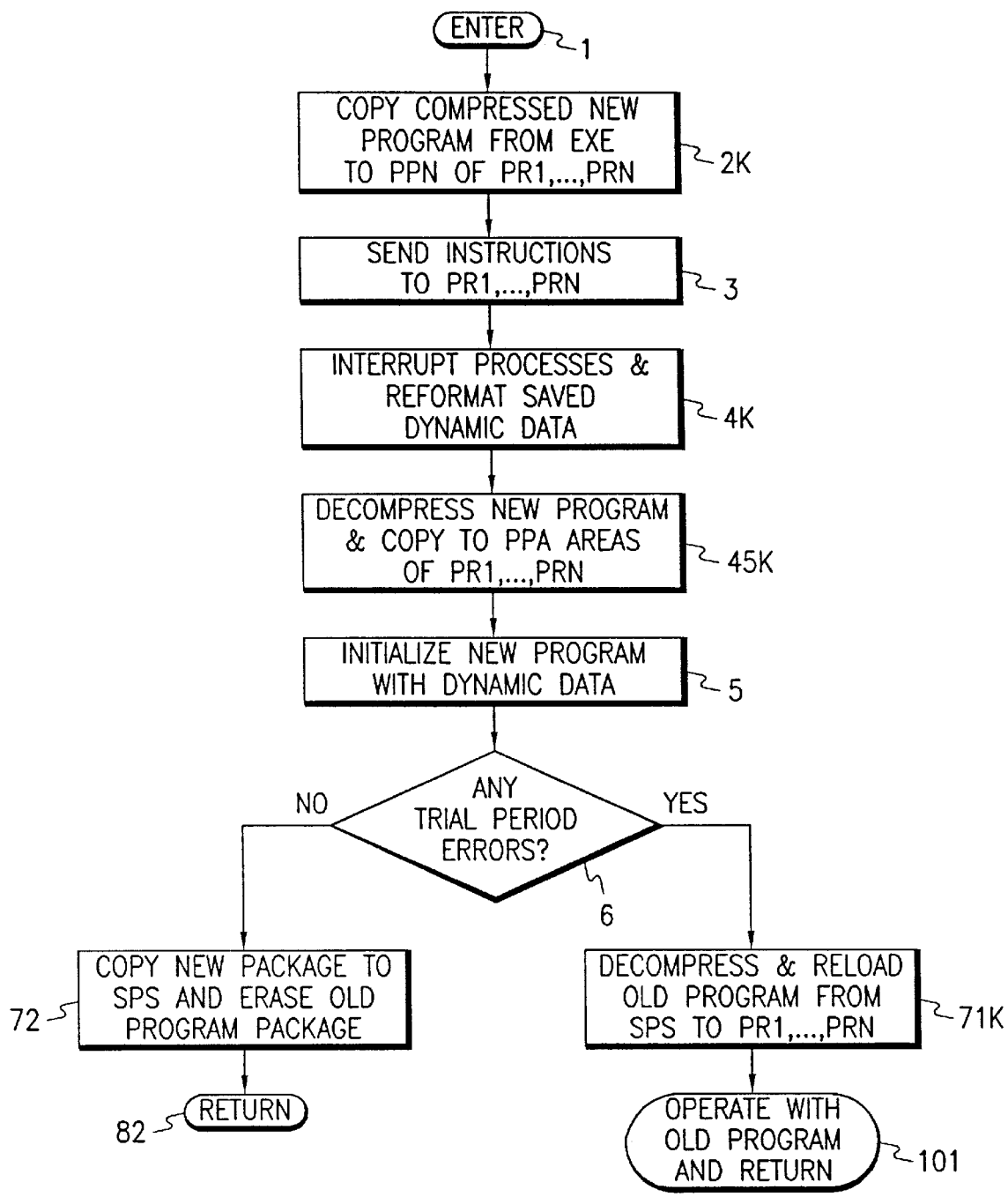
FIG. 3 is a flowchart of a second embodiment of the method according to the invention.

The second embodiment of the method according to the invention is shown in FIG. 3. The new program package is copied in compressed form to the main memories of the peripheral computers PR1, . . . , PRN and the system computer SR, and decompressed only in the main memories. This has the advantage that main memories of less capacity than in the first embodiment can be used. The second embodiment begins with step 1 as was described for the first embodiment of the method with the aid of FIG. 2. It is followed by a step 2K in which the new program package is copied in compressed form from the external input device EXE to the third areas PPN of the main memories of the peripheral computers PR1, . . . , PRN and the system computer SR. The next step, 3, corresponds to step 3 of the first embodiment. In the second embodiment, the second area DYD is not divided into subareas. In a step 4K, the current processes are interrupted and the saved dynamic data reformatted. Reformatting will not take place if the structure of the dynamic data has not changed. Prior to the initialization of the new program package with the dynamic data in step 5, the new program package stored in compressed form in the third areas PPN is decompressed and copied to the first areas PPA of the main memories of the peripheral computers PR1, . . . , PRN in a step 45K following step 4K, with the old program package in the first areas PPA being erased. If instabilities or error messages occur during the process steps or the trial period in step 6, the peripheral computer PR1, . . . , PRN which detects the error will, in a step 71K, send a load request via the computer communication network RKN to the system computer SR to reload the old program package. The system computer SR detects this load request by means of the loader stored in the sixth area LRN of its main memory, and causes the old program package stored in the semipermanent memory SPS to be loaded into the main memories of the peripheral computers PR1, . . . , PRN and into its own main memory. The old program package is stored in the semipermanent memory SPS in compressed form. Therefore, "loading" as used in the embodiment being described means decompressing the program package and initializing with the saved dynamic data. In a subsequent step 101, the multicomputer system MRS is operated again with the old program system. If no error messages occur in step 6, steps 72 and 82 will follow, as in the first embodiment.

If the capacity of the semipermanent memory SPS is sufficient to store both the old program package and the new one, the new program package will, in step 2K, i.e., during the preparation time, be also stored in compressed form in the semipermanent memory SPS. If error messages or instabilities occur, the system computer SR can decide on the basis of load requests received from the peripheral computers PR1, . . . , PRN via the computer communication network RKN whether the entire multicomputer system MRS will be reloaded with the old program package or whether one or more of the peripheral computer PR1, . . . , PRN or the system computer SR itself, if the error message relates to it, will be reloaded with the new program package. In this manner, different errors can be reacted to more flexibly during the program-package change.

The new program package can be either a complete operating system plus application programs or only parts thereof. Since, by the method according to the invention, the program-package change is performed simultaneously in all peripheral computers PR1, . . . , PRN and the system computer SR, interface and time compatibility of the new program package with the old program package is not necessary.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. A method of exchanging an old program package for a new program package in a multicomputer system (MRS) comprising a plurality of peripheral computers (PR1, . . . , PRN) and at least one system computer (SR), with the peripheral computers (PR1, . . . , PRN) and the at least one system computer (SR) connected to a computer communication network (RKN) and each peripheral computer having a main memory (RAM1), characterized by the following steps for execution in each of the peripheral computers (PR1, ..., PRN) and in the at least one system computer (SR):

copying the new program package to respective first areas (PPN) of the main memories (RAM1) of the peripheral computers (PR1, ..., PRN) and the at least one system computer (SR);

saving dynamic data of processes under control of the multicomputer system (MRS) in respective second areas (DYD) of the main memories (RAM1) upon reaching a selected point in the execution of the old program package; and initializing the new program package in the respective peripheral computers (PR1, ..., PRN) and the at least one system computer (SR) with the saved dynamic data.

2. A method as claimed in claim 1, further characterized by the step of interrupting the processes under control of the multicomputer system (MRS) by means of the old program package prior to initializing the new program package with the saved dynamic data.

3. The method of claim 1, wherein during said step of copying, said processes under control of the multicomputer system continue execution under said old program package.

4. A method as claimed in claim 3, further characterized by the step of storing the old program in a semipermanent memory (SPS) to which the at least one system computer (SR) is connected.

5. A method as claimed in claim 4, characterized in that after a lapse of a predetermined trial period of error-free operation of the multicomputer system (MRS) with the new program package following the step of initializing, said method is further characterized by the step of copying the new program package to the semipermanent memory (SPS).

6. A method as claimed in claim 4, further characterized by the steps of:

checking for an occurrence of an error during a predetermined trial period, loading the old program package from the semipermanent memory (SPS) into the at least one system computer (SR) and, via the computer communication network (RKN), into the peripheral computers (PR1, ..., PRN).

7. A method as claimed in claim 3, further characterized by the steps of:

copying the new program package from an external input device (EXE) to the main memory of the at least one system computer (SR), transmitting the new program package through the computer communication network (RKN) to the peripheral computers (PR1, ..., PRN) and copying the new program package to the main memories (RAM1) of the peripheral computers (PR1, ..., PRN) by means of the at least one system computer (SR).

8. A method as claimed in claim 3, further characterized by the step of reinitializing the old program package in the peripheral computers (PR1, ..., PRN) and the at least one system computer (SR) with the saved dynamic data on the occurrence of an error during a predetermined trial period following the step of initializing.

9. A method as claimed in claim 9, characterized in that said step of copying the new program package is a step of copying the new program package in compressed form to the respective first areas (PPN) of the main memories (RAM1) of the peripheral computers (PR1, ..., PRN) and the at least one system computer (SR), and that prior to the step of initialization with the saved dynamic data, the compressed new program package is decompressed.

10. A method as claimed in claim 9, characterized in that the capacity of the semipermanent memory (SPS) is sufficient to store both the old program package and the new one, so that in the step of copying, the new program package is copied to the semipermanent memory (SPS) while retaining the old program package in semipermanent memory (SPS).

11. A method as claimed in claim 10, further characterized by the steps of:

checking for an occurrence of an error during said steps of copying, saving, or initializing or during a predetermined trial period, in the presence of a system error, reloading the entire multicomputer system (MRS) with the old program package stored in the semipermanent memory (SPS) and, in the presence of a nonsystem error, reloading one or more of the peripheral computers (PR1, ..., PRN) and/or the at least one system computer (SR) with the new program package stored in the semipermanent memory (SPS).

12. A method as claimed in claim 9, further characterized by the steps of:

checking for an occurrence of an error during a predetermined trial period, loading the old program package from the semipermanent memory (SPS) into the at least one system computer (SR) and, via the computer communication network (RKN), into the peripheral computers (PR1, ..., PRN).

13. A computer (PR1) with a link (RA1) to a computer communication network (RKN) of a multicomputer system (MRS), said computer having a main memory (RAM1), characterized by a control means (SM1) connected to said main memory (RAM1) which, when an old program package is exchanged for a new program package, controls steps of copying the new program package to a first area (PPN) of the main memory (RAM1), saving dynamic data of processes being controlled by the multicomputer system (MRS) in a second area (DYD) of the main memory (RAM1) upon reaching a selected point in execution of the old program package, and initializing a new program package in the computer (PR1) with the saved dynamic data.

14. The computer of claim 13, wherein when said old program package is exchanged for a new program package, the processes being controlled by the multicomputer system continue to be executed by said old program package.

15. A computer as claimed in claim 14, characterized in that the control means (SM1) controls the steps of copying the new program package in compressed form to the first area (PPN) of the main memory (RAM1) and decompressing the compressed new program package prior to the initializing with the saved dynamic data.

* * * * *

UNITED STATES PATENT AND TRADEMARK OFFICE
CERTIFICATE OF CORRECTION

PATENT NO. : 5,852,735
DATED : December 22, 1998
INVENTOR(S) : H-J. Urban

It is certified that error appears in the above-identified patent and that said Letters Patent is hereby corrected as shown below:

At col. 8, line 1 (claim 9, line 1), please cancel "claim 9" and substitute --claim 3-- therefor; and Signed and Sealed this Fifteenth Day of February, 2000

Attest:

Q. TODD DICKINSON

*Attesting Officer*   *Commissioner of Patents and Trademarks*